United States Patent [19]
Wiegard

[11] 3,966,281
[45] June 29, 1976

[54] BEARING SUPPORT FOR A ROTATABLE REGENERATIVE HEAT EXCHANGER

[75] Inventor: Klaus Wiegard, Esslingen-Zollberg, Germany

[73] Assignee: Daimler-Benz Aktiengesellschaft, Germany

[22] Filed: Oct. 11, 1973

[21] Appl. No.: 405,278

[30] Foreign Application Priority Data
Oct. 11, 1972 Germany............................ 2249763

[52] U.S. Cl................................ 308/202; 308/214; 308/215
[51] Int. Cl.² ........................................ F16C 19/00
[58] Field of Search................ 308/202, 203, 207 R, 308/216, 217, 214, 215, 218, 211

[56] References Cited
UNITED STATES PATENTS

| | | | |
|---|---|---|---|
| 999,570 | 8/1911 | Lawson | 308/211 |
| 2,063,738 | 12/1936 | Hedgcock | 308/218 |
| 2,856,246 | 10/1958 | Gaubatz | 308/217 |

Primary Examiner—M. H. Wood, Jr.
Assistant Examiner—Richard A. Bertsch
Attorney, Agent, or Firm—Craig & Antonelli

[57] ABSTRACT

A bearing support for a rotatable regenerative heat-exchanger in disk form which is supported centrally on a support shaft by way of a roller bearing that includes drum-shaped roller bodies; the drum-shaped roller bodies are thereby several times longer than they are thick while the inner bearing surface of each roller body is formed by a concave surface portion, preferably constituted by a section of the bearing shaft itself, which has a smaller curvature as compared to the curvature of the drum-shaped roller bodies.

25 Claims, 3 Drawing Figures

BEARING SUPPORT FOR A ROTATABLE REGENERATIVE HEAT EXCHANGER

The present invention relates to a bearing support for a rotatable regenerative heat-exchanger in disk-form which is supported centrally on a support shaft.

In known bearing supports of this type for regenerative heat-exchangers consisting of ceramic material, a bush is provided in the center of the disk into which is pressed-in a barrel-shaped bolt which is rotatably supported on a shaft. The purpose of this support structure is to assure a guidance of the heat-exchanger disk, in which the disk is axially displaceable and tiltable by a few degrees. This will in fact be achieved with the prior art bearing support construction, however, it is connected with a high wear because an effective lubrication is practically not possible by reason of the extraordinarily high temperatures of the structural parts of the order of magnitude of about 700°C. prevailing in the bearing support zone, and therefore an increase of the bearing play occurs rapidly.

It is the aim of the present invention to provide a bearing support of the aforementioned type for a rotatable regenerative heat-exchanger which still operates with little wear also under such extreme conditions and nonetheless permits an axial displacement of the heat-exchanger disk as well as also a tilting thereof by a few degrees.

According to the present invention this is achieved in that the central bearing support is constituted by a roller bearing whose barrel-shaped or drum-shaped roller bodies are several times longer than they are thick and whose inner running surface is constituted by a concave section having a smaller curvature in comparison to the curvature of the barrel-shaped roller body.

With a view toward the realization of a bearing support which is as compact as possible it is appropriate in the construction of the present invention, if the inner contact or bearing surface is constituted by a section of the support shaft, i.e., if therefore a separate inner bearing race is dispensed with altogether.

In order to arrive in the bearing construction according to the present invention at a unit stress which is as small as possible, as is appropriate especially also for material reasons at the given extreme temperature stresses and loads, it is appropriate if the length of the roller body corresponds approximately to the thickness of the disk and if thus the available space is utilized as far-reaching as possible for the bearing support. The thus attainable radius of curvature for the barrel-shaped roller body enables a very small specific pressure.

In view of the given space conditions and with a view to a bearing assembly which is as simple as possible, it is appropriate if, according to the present invention, the bearing cage of the roller bearing is constructed multi-partite and includes bars extending in the axial direction which within the area of their ends are disposed in slot-shaped apertures or recesses provided at the end face of bushes. These bushes are appropriately overlapped within the area of their ends opposite the roller bodies by retaining bushes, and more particularly so far that also the bar ends disposed in the slot-shaped apertures or recesses are still partially overlapped by the retaining bushes.

In order to arrive with such an arrangement again at a construction which is as space-saving as possible, it is appropriate if the bushes provided with the slot-shaped recesses and the retaining bushes are each radially offset in the area of overlap, and more particularly with a corresponding thickness the retaining bushes radially inwardly thereof and the bushes provided with the slot-shaped recesses radially outwardly thereof.

In view of the fact that the bars are appropriately overlapped with the end portions thereof by the retaining bushes, it is appropriate if the slot-shaped apertures or recesses, which extend over the radial thickness of the bushes, extend also up to the area overlapped by the retaining bushes and if the end sections of the bars disposed in this area of overlap have merely a radial thickness in the offset area thereof corresponding to the radial thickness of the respective bushes provided with slots. Such a bearing construction enables also the axial fixing of the bearing in a simple manner. Furthermore, with such a construction of the bearing, the latter can be assembled without difficulties.

Accordingly, it is an object of the present invention to provide a bearing support for a rotatable regenerative heat-exchanger which avoids by simple means the aforementioned shortcomings and drawbacks encountered in the prior art.

Another object of the present invention resides in a bearing support for a rotatable regenerative heat-exchanger which operates with relatively little wear notwithstanding the extremely high thermal conditions prevailing thereat, yet permits an axial displacement of the heat-exchanger disk as well as a slight tilting through a few degrees.

A further object of the present invention resides in a bearing support for a rotatable regenerative heat-exchanger which is extraordinarily compact and utilizes relatively few parts that can be assembled in a simple manner.

Still a further object of the present invention resides in a bearing support of the type described above which achieves a low unit stress and low specific pressure in the various parts thereof.

These and further objects, features, and advantages of the present invention will become more apparent from the following description when taken in connection with the accompanying drawing which shows, for purposes of illustration only, one embodiment in accordance with the present invention, aand wherein.

Figure 1:
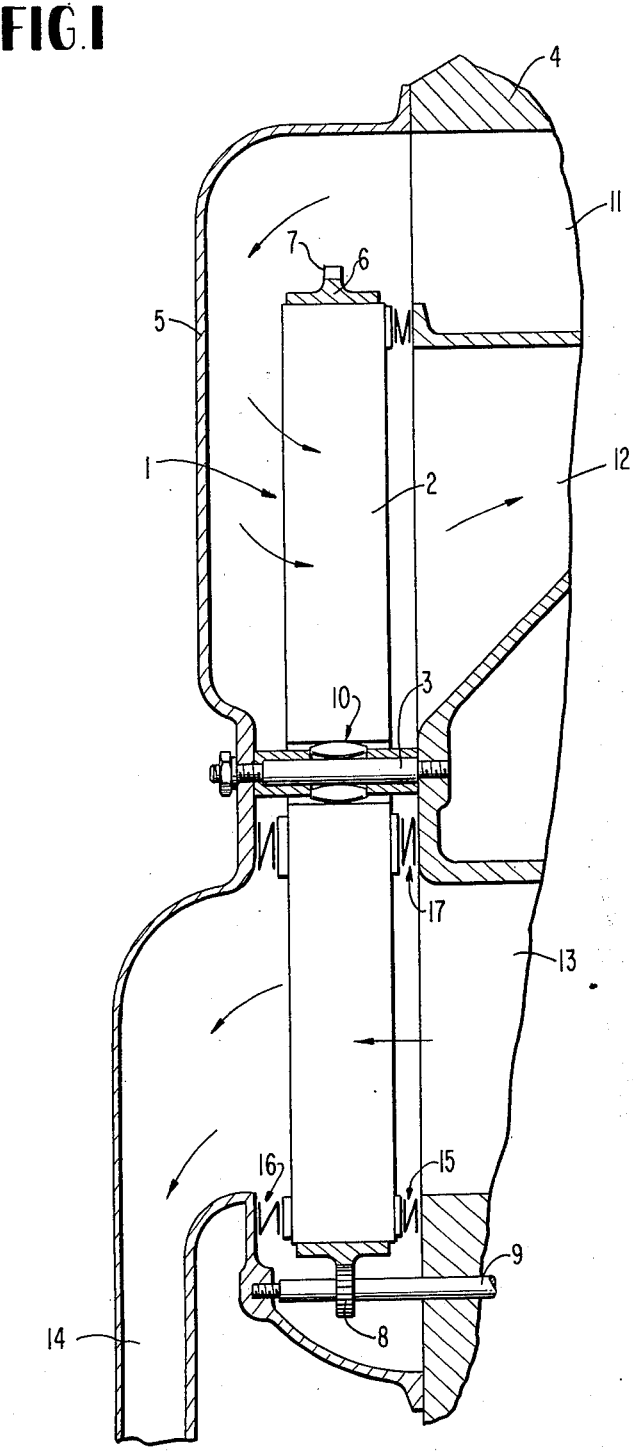
FIG. 1 is a partial schematic cross-sectional view of the arrangement of a rotatable regenerative heat-exchanger at a turbine housing not illustrated in detail.

Referring now to the drawing wherein like reference numerals are used throughout the various views to designate like parts, reference numeral 1 generally designates in the various figures the rotatable regenerative heat-exchanger whose disk 2 consisting of ceramic material is mounted by way of the support pin or shaft 3 at the housing 4 of a turbine of conventional construction and therefore not illustrated in detail. Furthermore, the lid-shaped covering 5 of the heat-exchanger 1 is also flangedly connected to the housing 4.

The disk 2 is surrounded at its outer circumference by a ring 6 which is provided radially outwardly thereof with a toothed ring 7 forming a ring gear. The heat-exchanger disk 2 is driven by way of the toothed ring gear 7. The drive takes place by way of a pinion 8 which is seated on a shaft 9 supported in the cover 5 and in the housing 4 and whose further connection to a rotating part of the turbine is not illustrated. For purposes of clarification, the pinion 8 and the shaft 9 as well as the cover elements serving for the support of these drive elements are shown offset in the illustrated embodiment.

The disk 2 adapted to be driven by way of the pinion 8 is, as already explained, supported centrally on the shaft or pin 3 which in the illustrated embodiment is anchored as threaded pin in a part of the turbine housing 4. The bearing support of the disk 2 on the support shaft 3 takes place by way of a roller bearing generally designated by reference numeral 10, as is also illustrated in greater detail in cross section in FIGS. 2 and 3.

As shown in FIG. 1, the heat-exchanger disk 2 is connected with the turbine housing 4 by way of yielding sealing elements of any known construction and therefore not shown in detail, and more particularly in such a manner that the two gas streams indicated herein only by arrows are separated from one another. This involves, on the one hand, a fresh air stream which is supplied by way of an air inlet channel 11 and after passage through the disk 2 is conducted to the combustion chamber (not shown). The only schematically indicated feed channel leading to the combustion chamber is indicated by reference numeral 12. On the opposite side, the hot gases or combustion gases coming from the combustion chamber and conducted by way of the turbine blades (not shown) reach the disk 2 by way of the exhaust channel 13, again only schematically indicated, where a considerable portion of the heat is removed therefrom during the passage through the disk 2 and from where the exhaust gases then reach the gas discharge channel 14, through which they can flow off, for example, into the atmosphere. The separation of the cold from the hot side takes place by seals 15 and 16, of which the seal 15 is constructed as annular seal with a cross web 17. The seal 16 corresponds in its basic form to that part of the seal 15 which is constituted by the cross web 17 and by that arc of the sealing ring 15 which surrounds the hot side. An essentially D-shaped base form results therefrom for the seal 16 as viewed in plan view.

Figure 2:
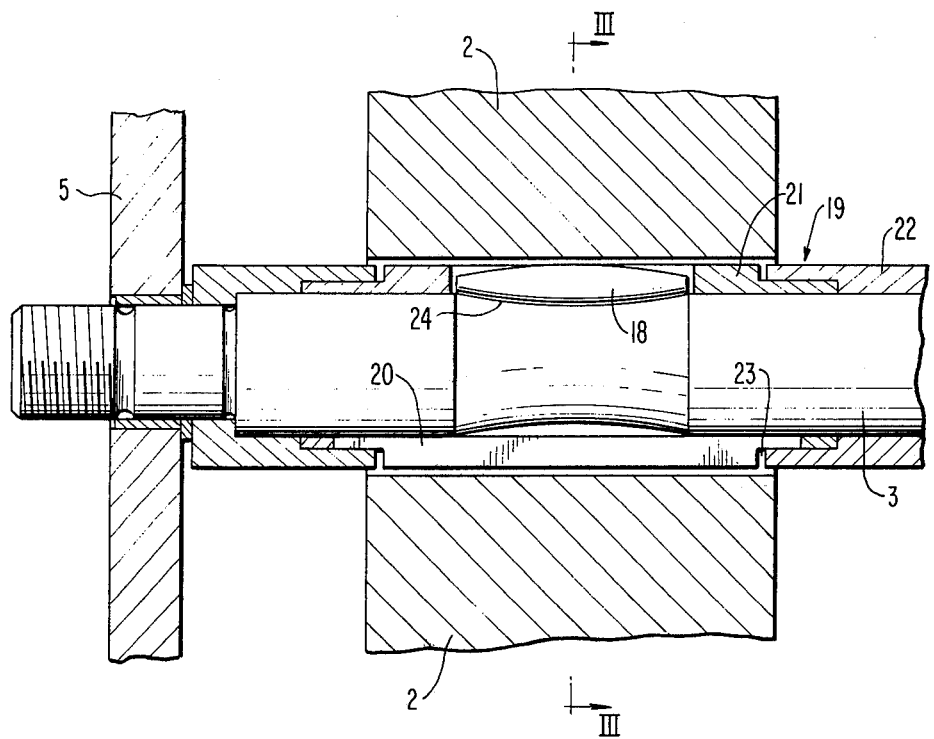
FIG. 2 is a cross-sectional view through the central bearing support of the heat-exchanger disk according to FIG. 1, on an enlarged scale, and taken along a sight line corresponding to line II—II in FIG. 3 with several roller bodies removed.
Figure 3:
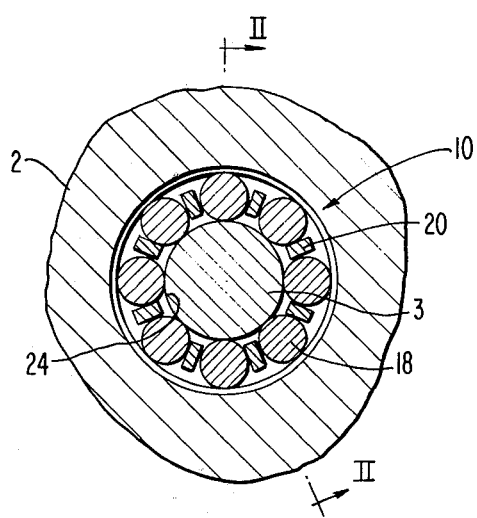
FIG. 3 is a partial cross-sectional view taken along line III—III of FIG. 2 but with the roller bodies in place.

The roller bearing illustrated in detail in FIGS. 2 and 3 includes barrel-shaped or drum-shaped roller bodies 18 which have a slight curvature and are by a multiple longer than they are thick and whose length corresponds preferably nearly to the thickness of the disk 2. A cage generally designated by reference numeral 19 is coordinated to the barrel-shaped roller bodies 18 which consists altogether of bars 20, bushes 21 and retaining bushes 22. The bushes 21 are provided with axial slots 23 starting from the end faces thereof facing the roller bodies 18, which slots 23 have a constant spacing with respect to one another over the circumference of the bushes and which receive the ends of the bars 20. One roller body 18 thereby lies between two bars 20 each, whose maximum diameter corresponds approximately to the distance of two adjacent bars 20 as measured in the circumferential direction.

The bushes 21 are radially outwardly thereof offset in diameter within the area thereof opposite the roller bodies 18. In a corresponding manner, the retaining bushes 22 have radially inwardly thereof an offset within the end areas facing the roller bodies 18. The bushes 21 and 22 overlap one another in these alternately mutually offset areas. The bars 20 are simultaneously also radially fixed by this overlap since the slots 23 in the bushes 21 extend up to within this overlapping area and since the bars 20 at the ends thereof disposed within this area of overlap are so far offset or reduced in thickness from the outside that the radial thickness thereof corresponds to the thickness of the slotted bushes 21 in their offset end areas, which has as a consequence that the retaining bushes 22, as can be seen from FIG. 2, can be slipped over the end areas of the bars 20. Simultaneously an axial fixing of the roller bearing 10 is attainable by way of the retaining bushes 22, the slotted bushes 21 and the bars 20, as can be seen from FIGS. 1 and 2, with a corresponding axial clamping.

A separate inner race for the roller bearing is dispensed with in the solution according to the present invention and the bearing pin or shaft 3 forms in a correspondingly machined section 24 the inner bearing surface for the roller bodies 18. Within the section 24, the bearing pin or shaft 3 is ground concave, and more particularly with a curvature which is slightly smaller than the curvature of the drum-shaped roller bodies, i.e., the radius of curvature of the curved bearing surface 24 is slightly larger than the radius of curvature of the outer bearing surfaces of the roller bodies 18. A bush centrally inserted into the disk may serve as outer bearing race which is not illustrated in the drawing. However, it is also possible with small loads to dispense with a separate bush and to provide a direct contact of the disk material on the roller bodies.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A bearing support for a rotatable regenerative heat-exchanger in disk form which is rotatably supported on support shaft means characterized in that the bearing support includes roller bearing means having approximately barrel-shaped roller bodies whose length is a multiple of their thickness, said roller bearing means including inner bearing surface means formed by a concave surface portion with a radius of curvature which is larger than the radius of curvature of curved outer surfaces of the barrel-shaped roller bodies.

2. A bearing support according to claim 1, characterized in that the radius of curvature of the concave surface portions is only slightly larger than the radius of curvature of the outer surfaces of the barrel-shaped roller bodies.

3. A bearing support according to claim 1, characterized in that the inner bearing surface means is constituted by a section of the support shaft means.

4. A bearing support according to claim 1, characterized in that the length of each roller body is a multiple of the thickness of each roller body.

5. A bearing support according to claim 1, characterized in that said roller bearing means includes an outer bearing surface which is cylindrical.

6. A bearing support according to claim 3, characterized in that the support shaft means is connected to cover means for the disk.

7. A bearing support according to claim 6, characterized in that the connection of the support shaft means to said cover means is a threaded connection.

8. A bearing support for a heat exchanger with a disk according to claim 3, characterized in that the length of the roller bodies corresponds approximately to the thickness of the disk.

9. A bearing support according to claim 8, characterized in that the roller bearing means includes a bearing cage means which is constructed multi-partite and includes bars extending in the axial direction which, within the area of their ends, are disposed in slot-shaped recesses provided in bush means at the end faces of the latter.

10. A bearing support according to claim 9, characterized in that the bush means provided with the slot-shaped recesses are overlapped within the area of the ends thereof opposite the roller bodies by retaining bush means.

11. A bearing support according to claim 10, characterized in that the bush means provided with the slot-shaped recesses and the retaining bush means are radially offset in opposite directions within the area of overlap.

12. A bearing support according to claim 11, characterized in that the bush means provided with the slot-shaped recesses are offset radially outwardly thereof and the retaining bush means are offset radially inwardly, thereof, the offsets being each with a substantially corresponding thickness.

13. A bearing support according to claim 4, characterized in that the slot-shaped recesses which extend substantially over the radial thickness of the bush means thereof, extend up to the area overlapped by the retaining bush means, and in that the end sections of the bars disposed within this area of overlap have merely a radial thickness corresponding to the radial thickness of the bush means provided with the slot-shaped recesses within the offset area thereof.

14. A bearing support according to claim 13, characterized in that the radius of curvature of the concave surface portions is only slightly larger than the radius of curvature of the outer surfaces of the barrel-shaped roller bodies.

15. A bearing support for a heat exchanger with a disk according to claim 1, characterized in that the length of the roller bodies corresponds approximately to the thickness of the disk.

16. A bearing support according to claim 1, characterized in that the roller bearing means includes a bearing cage means which is constructed multi-partite and includes bars extending in the axial direction which, within the area of their ends, are disposed in slot-shaped recesses provided in bush means at the end faces of the latter.

17. A bearing support according to claim 16, characterized in that the bush means provided with the slot-shaped recesses are overlapped within the area of the ends thereof opposite the roller bodies by retaining bush means.

18. A bearing support according to claim 17, characterized in that the bush means provided with the slot-shaped recesses and the retaining bush means are radially offset in opposite directions within the area of overlap.

19. A bearing support according to claim 18, characterized in that the bush means provided with the slot-shaped recesses are offset radially outwardly thereof and the retaining bush means are offset radially inwardly, thereof, the offsets being each with a substantially corresponding thickness.

20. A bearing support according to claim 19, characterized in that the slot-shaped recesses which extend substantially over the radial thickness of the bush means thereof, extend up to the area overlapped by the retaining bush means, and in that the end sections of the bars disposed within this area of overlap have merely a radial thickness corresponding to the radial thickness of the bush means provided with the slot-shaped recesses within the offset area thereof.

21. A bearing support according to claim 17, characterized in that the slot-shaped recesses which extend substantially over the radial thickness of the bush means thereof, extend up to the area overlapped by the retaining bush means, and in that the end sections of the bars disposed within this area of overlap have merely a radial thickness corresponding to the radial thickness of the bush means provided with the slot-shaped recesses within the offset area thereof.

22. A bearing support for a rotatable regenerative heat-exchanger comprising:
roller bearing means having approximately barrel-shaped roller bodies for supporting said heat-exchanger, said roller bodies contacting outer race means comprised of a cylindrical surface.

23. A bearing support for a disk-shaped rotatable regenerative heat-exchanger comprising roller bearing means having approximately barrel-shaped roller bodies for supporting said heat-exchanger, said roller bodies contacting outer race means on a cylindrical surface of said heat-exchanger.

24. A bearing support for a rotatable regenerative heat-exchanger comprising roller bearing means having approximately barrel-shaped roller bodies for centrally supporting said heat-exchanger at a cylindrical surface comprising an outer race contacted by said roller bodies.

25. A bearing support for a rotatable regenerative heat-exchanger comprising roller bearing means having approximately barrel-shaped roller bodies for supporting said heat-exchanger, said roller bodies contacting outer race means comprised of a cylindrical surface, wherein a bush is inserted into said disk so as to serve as said outer race.

* * * * *